(12) United States Patent
Malhas et al.

(10) Patent No.: US 9,008,375 B2
(45) Date of Patent: Apr. 14, 2015

(54) SECURITY IMPROVEMENTS FOR IRIS RECOGNITION SYSTEMS

(71) Applicants: Imad Malhas, Amman (JO); Andrew Holland, Aylesbury (GB); Alan Renforth, Malvern (GB)

(72) Inventors: Imad Malhas, Amman (JO); Andrew Holland, Aylesbury (GB); Alan Renforth, Malvern (GB)

(73) Assignee: IrisGuard Inc., Amman (JO)

( * ) Notice: Subject to any disclaimer, the term of this patent is extended or adjusted under 35 U.S.C. 154(b) by 167 days.

(21) Appl. No.: 13/646,424

(22) Filed: Oct. 5, 2012

(65) Prior Publication Data
US 2013/0089241 A1    Apr. 11, 2013

(30) Foreign Application Priority Data

Oct. 7, 2011    (GB) .................................. 1117348.1

(51) Int. Cl.
*G06K 9/00*    (2006.01)
*G06K 9/20*    (2006.01)

(52) U.S. Cl.
CPC ........ *G06K 9/00906* (2013.01); *G06K 9/00597* (2013.01); *G06K 9/2036* (2013.01)

(58) Field of Classification Search
None
See application file for complete search history.

(56) References Cited

U.S. PATENT DOCUMENTS

| | | | |
|---|---|---|---|
| 4,641,349 A | 2/1987 | Flom et al. | |
| 5,283,598 A | 2/1994 | McMillan et al. | |
| 5,291,560 A | 3/1994 | Daugman | |
| 5,608,489 A | 3/1997 | Ozaki | |
| 5,696,998 A | 12/1997 | Yamada et al. | |
| 5,801,763 A | 9/1998 | Suzuki | |
| 5,901,238 A | 5/1999 | Matsushita | |
| 5,933,502 A | 8/1999 | Aucsmith et al. | |
| 6,120,461 A | 9/2000 | Smyth | |
| 6,315,194 B1 | 11/2001 | Graef et al. | |
| 6,332,193 B1 | 12/2001 | Glass et al. | |
| 7,574,270 B2 | 8/2009 | Takahashi et al. | |
| 7,660,437 B2 | 2/2010 | Breed | |
| 7,796,784 B2 | 9/2010 | Kondo et al. | |
| 8,028,896 B2 | 10/2011 | Carter et al. | |

(Continued)

FOREIGN PATENT DOCUMENTS

DE    20 2007 005 012 U1    6/2007
EP         1 452 127 A1    9/2004

(Continued)

OTHER PUBLICATIONS

Huang, W. et al., "A New AutoFocus Method Used in Portable Iris Image Acquisition System," 3rd International Congress on Image and Signal Processing, 2010, pp. 2008-2011.

(Continued)

*Primary Examiner* — Hadi Akhavannik
(74) *Attorney, Agent, or Firm* — Fenwick & West LLP

(57) ABSTRACT

A method of verifying the authenticity of an eye provided for identification purposes in an iris recognition identification system is described. The method comprises: illuminating the eye using an illumination source to generate a specular reflection in a pupil and/or iris region of the eye, the specular reflection forming as a result of light emitted from the illumination source being reflected from the eye; capturing an image of the eye including the specular reflection; determining the position of the specular reflection formed in the pupil and/or iris region, from the captured image; and verifying the authenticity of the eye by comparing the determined position with an expected position for an authentic eye.

23 Claims, 8 Drawing Sheets

(56) References Cited

U.S. PATENT DOCUMENTS

| | | | |
|---|---|---|---|
| 8,397,988 B1 | 3/2013 | Zuili | |
| 8,423,453 B1 | 4/2013 | Elliott | |
| 8,509,473 B2 | 8/2013 | Wagner | |
| 2002/0181774 A1 | 12/2002 | Ishikura | |
| 2003/0012413 A1 | 1/2003 | Kusakari et al. | |
| 2003/0152251 A1 | 8/2003 | Ike | |
| 2004/0037450 A1* | 2/2004 | Bradski | 382/103 |
| 2006/0087582 A1 | 4/2006 | Scharenbroch et al. | |
| 2007/0110285 A1* | 5/2007 | Hanna et al. | 382/117 |
| 2007/0274571 A1 | 11/2007 | Hamza | |
| 2008/0084499 A1 | 4/2008 | Kisacanin et al. | |
| 2008/0156872 A1 | 7/2008 | Register et al. | |
| 2009/0046249 A1 | 2/2009 | Northcott et al. | |
| 2009/0237208 A1 | 9/2009 | Tsukahara et al. | |
| 2009/0282258 A1 | 11/2009 | Burke et al. | |
| 2009/0289112 A1 | 11/2009 | Bonalle et al. | |
| 2009/0304232 A1* | 12/2009 | Tsukizawa | 382/103 |
| 2010/0161488 A1 | 6/2010 | Evans et al. | |
| 2010/0195049 A1 | 8/2010 | Stark et al. | |
| 2012/0170027 A1 | 7/2012 | Tsukizawa et al. | |
| 2013/0089240 A1 | 4/2013 | Northcott et al. | |
| 2013/0148111 A1 | 6/2013 | Hanssen et al. | |

FOREIGN PATENT DOCUMENTS

| | | |
|---|---|---|
| EP | 1 911 393 | 4/2008 |
| JP | 2003-006628 A | 1/2003 |
| JP | 2004-164483 A | 6/2004 |
| WO | WO 86/05018 A1 | 8/1986 |
| WO | WO 94/09446 A1 | 4/1994 |
| WO | WO 98/08439 A1 | 3/1998 |
| WO | WO 99/27844 A1 | 6/1999 |
| WO | WO 99/38121 A1 | 7/1999 |
| WO | WO 02/087442 A1 | 11/2002 |
| WO | WO 2010/099475 A1 | 9/2010 |

OTHER PUBLICATIONS

United Kingdom Intellectual Property Office, Search Report, Patent Application No. GB 1117348.1, Jan. 16, 2012, three pages.
Daugman, J., "How Iris Recognition Works," *IEEE Transactions on Circuits and Systems for Video Technology,* Jan. 2004, pp. 21-30, vol. 14, No. 1.
Daugman, J., "The importance of being random: statistical principles of iris recognition," *Pattern Recognition,* 2003, DD. 279-291, vol. 36.
Hecht, E., "Optics," ©Pearson Education Inc., publishing as Addison Wesley, ISBN 0-321-18878-0, Chapter 4, 2002, pp. 112-122.
LG Electronics U.S.A., Inc., "Iris Access—Advanced Identity Authentication," *Technical Specifications,* 2009, two pages.
United Kingdom Intellectual Property Office, Search Report, Patent Application No. GB 1121411.1, Apr. 11, 2012, three pages.
United Kingdom Intellectual Property Office, Search Report, Patent Application No. GB1117346.5, Jun. 6, 2012, two pages.
United Kingdom Intellectual Property Office, Search Report, Patent Application No. GB1117356.4, Jan. 24, 2012, three pages.

* cited by examiner

SECURITY IMPROVEMENTS FOR IRIS RECOGNITION SYSTEMS

CROSS REFERENCE TO RELATED APPLICATIONS

This application claims the right of priority under 35 U.S.C. §119 to GB application serial no. 1117348.1, filed Oct. 7, 2011, which is incorporated by reference in its entirety.

FIELD

The present invention concerns security improvements for use with iris recognition systems and more particularly, though not exclusively to the use of a randomly generated security feature in an iris identification recognition system.

BACKGROUND

The use of biometric identification systems is becoming ever more widespread for uniquely identifying people. The majority of known biometric identification systems use one or more intrinsic physical characteristics of a person for identification purposes. The accuracy of a biometric identification system is dependent on the uniqueness of the selected physical characteristic.

The iris is an example of a unique physical characteristic suitable for use in biometric identification systems to identify a person. Such biometric identification systems, generically referred to as iris recognition technology, have become increasingly popular. One advantage of this technology over other known biometric technologies, is that iris recognition technology has the smallest outlier (those user's who cannot use the system) group of all known biometric technologies. For this reason it is considered to be the most suitable biometric identification technology for mass use. Furthermore, due to the speed of comparison of iris recognition identification systems, it is the only known biometric technology well-suited for one-to-many identification.

Known iris recognition identification systems use pattern-recognition techniques to uniquely identify an iris pattern from a captured image of the irides of an individual's eyes. U.S. Pat. No. 5,291,560 discloses an example of a known iris recognition identification system, and describes in detail how such systems work. The article "How Iris Recognition Works", published in IEEE Transactions on Circuits and Systems for Video Technology, Vol. 14, No. 1, January 2004, authored by John Daugman, who is incidentally the inventor of the afore cited patent, provides a discussion of the underlying principles explaining how iris recognition identification systems work.

As with other known biometric identification systems, iris recognition identification systems are also susceptible to fraud, and accordingly security features are required to mitigate against such threats. One shortcoming of known iris recognition identification systems, is that they are unable to accurately distinguish between a photograph of an iris and a real iris. Accordingly, it is possible to provoke a false positive identification result simply by presenting a suitably high-definition image of an iris for identification (i.e. for scanning) by an iris recognition identification system. In supervised environments, where the iris recognition identification system is operated by a human operator, this shortcoming does not present a cause for concern, since the operator supervises the iris image capture process, and can verify that a real iris is being presented to the iris recognition identification system.

In contrast, this security shortcoming presents a significant cause for concern in unsupervised environments, where the iris recognition identification system is operated in the absence of a supervising human operator. In such environments it is relatively straightforward to deceive the iris recognition identification system into generating a false-positive match by presenting a photograph, or similar captured image, of an iris to the iris recognition identification system. This shortcoming of known iris recognition identification systems severely limits the diverse environments in which they may be used.

To date, there is no known solution to this problem. Known iris recognition identification systems are used almost exclusively in supervised environments. Where iris recognition identification systems are used in unsupervised environments, there is a high risk of the systems being defrauded. Improved security features are thus required for iris recognition identification systems to reduce the security vulnerabilities of such systems, in addition to increasing the diverse range of environments in which iris recognition identification systems may be securely operated. In particular, improved security features are required to enable iris recognition identification systems to be operated in unsupervised environments where it is not possible to verify prior to iris image capture, that the iris presented for image capture is a real iris instead of a pre-captured image of the iris.

It is an object of the present invention to mitigate for the above described security shortcomings inherent in known prior art iris recognition identification systems, and in particular to provide an improved security feature which enables iris recognition identification systems to be securely operated in unsupervised environments by being able to accurately distinguish a real iris from an image of the iris.

SUMMARY

In accordance with a first aspect of the present invention, a method of verifying the authenticity of an eye provided for identification purposes in an iris recognition identification system, the method comprising: illuminating the eye using an illumination source to generate a specular reflection in a pupil and/or iris region of the eye, the specular reflection forming as a result of light emitted from the illumination source being reflected from the eye; capturing an image of the eye including the specular reflection; determining the position of the specular reflection formed in the pupil and/or iris region, from the captured image; and verifying the authenticity of the eye by comparing the determined position with an expected position for an authentic eye.

This aspect of the invention utilises the reflective properties of the human eye to verify its authenticity. The method is particularly effective at distinguishing a real eye from a photograph of an eye. Since the reflective characteristics of an object are dependent on its constituent material, and its physical characteristics, a photograph will not generate a specularity in the same way as an iris, and specifically it won't generate a specularity at the same position in the pupil and/or iris region as an authentic eye would. The deterministic nature of the specularity position in the pupil/iris region arising from light incident on the cornea thus enables the specularity to be used as a security feature in an iris recognition identification system to minimise the likelihood of the system generating false positive iris identification results when the system is presented with a photograph of an eye, or such like in place of a real eye for identification.

In alternative embodiments of the present invention, the method further comprises varying the location of the specular reflection formed in the pupil and/or iris region of the eye over time, by varying the angle of incidence of the light incident on the cornea of the eye in the illuminating step; the capturing step comprises capturing a sequence of image frames of the eye including the specular reflection; the determining step comprises analysing each captured image frame to determine the position of the specular reflection formed in the pupil and/or iris region for each captured image frame; and the verifying step comprises verifying the authenticity of the eye by calculating an expected specular reflection position for each captured image frame in the sequence, and comparing the determined position with the expected position for each image frame.

Such alternative embodiments are more secure, since the position of the specularity is time-varying, and the verification step requires analysing each captured image frame and comparing the determined position of the specularity in each captured image frame with an expected position. The time-variance of the specularity means that it is significantly more difficult for a fraudulent, malicious user to anticipate the position where the specularity is formed in each captured image frame. Furthermore, the practical difficulties in generating a sequence of photographs each comprising a specularity positioned at a location consistent with the expected position, ensure that the security of the present embodiment is extremely high, and resistant to fraudulent acts. For example, where photographs of an eye are used to fraudulently deceive an iris recognition identification system.

In preferred embodiments, the verification step comprises determining that the eye is authentic if the determined position is substantially coincident with the expected position; and determining that the eye is not authentic if the determined position is not substantially coincident with the expected position. In this way, any unacceptable inconsistency between the determined specularity position and expected position is indicative that the eye is not authentic. This may occur where, for example the eye presented for identification before the iris recognition identification system is a photograph of an eye.

Alternatively, the expected position is associated with a range of expected position values, the verifying step comprises comparing the determined position with the range of expected values and determining that the eye is authentic if the determined position lies within the range of expected positions. Equally, where the determined position lies outside the range of expected positions it is determined that the eye is not authentic.

Preferably the angle of incidence of the light incident on the eye is varied by varying the relative position of the active illumination source with respect to the eye. Since the position of the specularity in the iris/pupil region of the human eye is dependent on the angle of incidence of the incident light rays, which in turn is dependent on the relative position of the light source with respect to the eye, the position of the specularity may be varied by varying the relative position of the light source with respect to the eye.

Certain embodiments further comprise using a plurality of different illumination sources, each illumination source being located at a different position with respect to the eye; and wherein the varying step comprises varying the relative position of the active illumination source in time by activating one or more different illumination sources over time. In this way the position of the specularity in the iris and/or pupil region is varied by activating a different light source.

In such embodiments, preferably an illumination source activation sequence defining which one or more of the plurality of different illumination sources are to be activated is generated. The activation sequence also defines the sequence in which they are to be activated in the illuminating step.

Preferably, the activation sequence is a randomly generated sequence of illumination source activation events. Each illumination source activation event defines which illumination source is to be activated, and the duration of activation. Accordingly, different events may be associated with a different one of the plurality of illumination sources. This ensures that the illumination sources are activated randomly, which increases the security of the system, by decreasing the likelihood of the sequence being successfully anticipated by a fraudulent, malicious user.

In preferred embodiments, the capturing step comprises capturing the sequence of image frames at a rate of 30 frames per second, or in other words at a rate of 30 Hz. Alternatively, the capture rate may be 20 frames per second, or in other words at a rate of 20 Hz. These capture rates ensure that the present verification method may be carried out in a short period of time, without sacrificing the security of the method, and when used in a conventional iris recognition identification system, do not result in any noticeable increase in the time latency for carrying out biometric identification (i.e., the time taken to verify the identity associated with an iris, also referred to as iris recognition).

Preferably, the verifying step comprises calculating a radial distance D of the expected specular reflection position, expressed with respect to the centre of the eye's pupil, using the equation:

$$D = R \sin \theta$$

where R is the radius of curvature of the cornea of the illuminated eye, and $\theta$ is the angle of incidence of light emitted from the activated illumination source incident on the cornea. The mathematical equation expresses the quantitative relationship between the angle of incidence and the radial distance of the formed specularity from the pupil centre for a human eye. This mathematical relationship holds true for a human eye, and will be different for different reflecting surfaces—for example, for a photograph or other glossy surface. In this way, the present method is able to determine the authenticity of the eye in which the specularity is formed, on the basis of the determined specularity position.

In some embodiments, the position of the specular reflection is determined in the determining step by first converting the captured image into a negative image, where the light coloured image regions are converted to dark coloured image regions and vice versa. This facilitates identification of the specular reflection in the captured image, which now requires identifying the darkest coloured pixels.

Preferably, the determining step comprises identifying the iris and/or pupil in the captured image before determining the position of the specular reflection.

In accordance with a second aspect of the present invention, apparatus for verifying the authenticity of an eye provided for identification purposes in an iris recognition identification system is provided. The apparatus comprises: an illumination source for illuminating the eye to generate a specular reflection in a pupil and/or iris region of the eye, the specular reflection forming as a result of light emitted from the illumination source being reflected from the eye; activating means for activating the illumination source; an image capture device arranged to capture an image of the eye including the specular reflection; a processor arranged to determine a position of the specular reflection in the pupil and/or iris region from analysis of the captured image; and verifying means arranged to verify the authenticity of the eye by comparing the determined position of the specular reflection with an expected position for the specular reflection of an authentic eye in the captured image.

The present apparatus enables the afore described verification method to be carried out and accordingly shares the same aforementioned benefits and advantages.

In preferred embodiments, the apparatus comprises specularity position varying means for varying the position of the specular reflection, by varying the angle of incidence of the light emitted from the illumination source incident on the cornea of the eye.

The specularity position varying means may comprise illumination source position varying means arranged to vary the relative position of the illumination source with respect to the eye to vary the position of the specular reflection in the pupil and/or iris region of the eye. This enables a time-varying specularity to be generated, and provides the same advantages as the afore described equivalent method feature. For example, the specularity position varying means improves the security of the apparatus since the time-variance of the generated specularity means that it is significantly more difficult for a fraudulent, malicious user to anticipate the position where the specularity is formed in the captured image frame.

The apparatus may comprise a plurality of different illumination sources, and wherein the position varying means is arranged to simultaneously activate one or more of the plurality of different illumination sources.

In preferred embodiments, the apparatus comprises image analysis means arranged to localise the pupil and the iris in one or more captured images of the eye. This facilitates determining the position of the formed specularity with respect to the centre of the pupil.

Preferably the apparatus comprises a sequence signal generating means, arranged to generate an activation sequence signal for use by the activating means. The activation sequence signal specifies the sequence in which the illumination source is to be activated, and the duration of activation. In preferred embodiments the activation sequence signal is a randomly generated sequence of illumination source activation events. Each activation event relates to a different portion of the signal, separated from adjacent events by a randomly generated unit of time. For example, this might relate to a randomly generated sequence of pulses, each pulse being separated from its adjacent pulses by a randomly generated unit of time, and each pulse being associated with an illumination source. When received by the associated illumination source the event activates the illumination source. In this way, the illumination source may be activated at random intervals. Where the apparatus comprises a plurality of illumination sources, the activation events may also be associated with different illumination sources, which when received activate the associated illumination source and may define the duration of activation. In this way, different illumination sources may be activated at different random intervals for different periods of time.

This introduces an element of uncertainty in the activation of the illumination sequence, which makes it more difficult for a fraudulent, malicious user to anticipate the position of the specularity formed in the iris/pupil region, caused by the randomly activated illumination source. As a result, the security of the present apparatus is improved.

In accordance with another aspect of the present invention there is provided, an apparatus for verifying the authenticity of an eye provided for identification purposes in an iris recognition identification system, the apparatus comprising: an illumination source for illuminating the eye to generate a specular reflection in a pupil and/or iris region of the eye, the specular reflection forming as a result of light emitted from the illumination source being reflected from the eye; an activation module for activating the illumination source; an image capture device arranged to capture an image of the eye including the specular reflection; a processor arranged to determine a position of the specular reflection in the pupil and/or iris region from analysis of the captured image; and a verifying module arranged to verify the authenticity of the eye by comparing the determined position of the specular reflection with an expected position for the specular reflection of an authentic eye in the captured image.

Further aspects and advantageous features of the invention are set out in the ensuing description, figures and appended claims.

DETAILED DESCRIPTION

Specific embodiments of the present invention are now described with reference to the appended figures. The described embodiments are for illustrative purposes only and are not limiting to the present invention.

Figure 1:
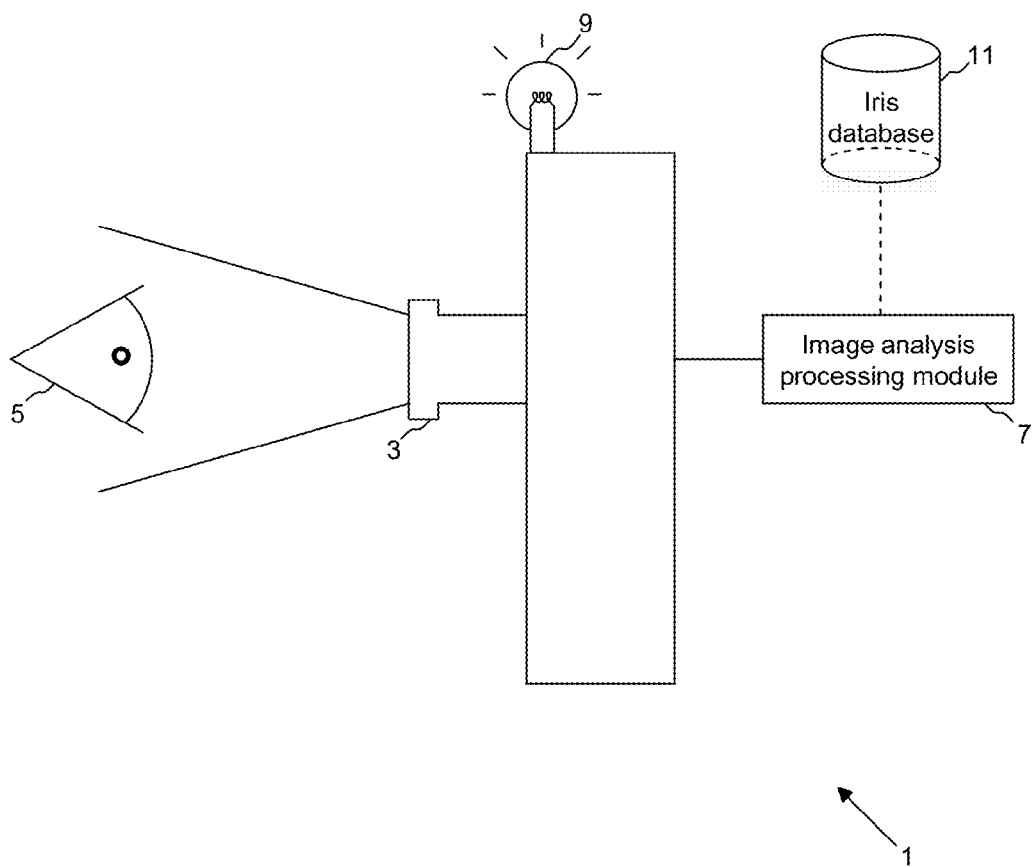
FIG. 1 is a schematic diagram showing a conventional, known iris recognition identification system.

A brief description of a known iris recognition identification system 1 is provided with reference to FIG. 1 to aid the readers understanding of the present invention. Conventional iris recognition identification systems 1 comprise a camera 3 for capturing images of an eye 5, and specifically to capture images of one or more of a user's irides.

An initial user registration process is carried out to enable the iris recognition identification system 1 to be subsequently used to identify the registered user. This registration process usually comprises capturing at least one image of at least one of the user's eyes, and generating at least one bit pattern from the at least one captured iris images. This comprises generating a bit pattern from the iris pattern captured in the iris image. The bit pattern is effectively a binary string which is unique.

More sophisticated iris identification recognition systems require images of both irides of a user's eye pair to be captured—so-called multi-eye systems. In such systems, an iris bit pattern is generated of each one of the user's irides. Multi-eye systems are substantially similar to mono-eye systems, with the exception that successful identification of a user, requires generating a positive match of both iris bit patterns. On this basis, multi-eye systems may be considered to be more secure than mono-eye systems. The present invention may be used in conjunction with either mono- or multi-eye iris identification recognition systems. Going forward, it is to be understood that all the methods and apparatus of the present invention may equally be adapted for use in mono- or multi-eye systems, and such embodiments fall within the scope of the present invention.

The majority of known iris recognition identification systems use Daugman's algorithms to generate the bit pattern. A detailed discussion of Daugman's algorithms falls outside the scope of the present invention however, the interested reader is referred to U.S. Pat. No. 5,291,560, and/or the article entitled "How Iris Recognition Works" by John Daugman, published in IEEE Transactions on Circuits and Systems for Video Technology, Vol. 14, No. 1, January 2004 for a detailed discussion of Daugman's algorithms. For present purposes it suffices to note that Daugman's algorithms effectively associate a binary number to points comprised within the imaged iris, on the basis of the value of the image intensity function at the sampled image points. The bit pattern is conventionally 256 bytes (i.e., 2048 bits) in size. The statistical likelihood that two different irides are associated with the same identical bit pattern is extremely low—for practical purposes the bit patterns are effectively unique.

Returning to FIG. 1, in addition to comprising a camera 5 or similar image capture device, iris recognition identification systems also comprise an image analysis processing module 7. The image analysis processing module 7 is configured to identify the iris from the captured image of the eye 5. This process is often referred to as "localisation." One way of achieving this, which is known in the prior art, is to use the image intensity contrast between respectively the iris and the pupil, and the iris and sclera (see U.S. Pat. No. 5,291,560, and/or the article titled "How Iris Recognition Works" by John Daugman, published in IEEE Transactions on Circuits and Systems for Video Technology, Vol. 14, No. 1, January 2004, for a more complete discussion). In short, the method comprises identifying the positions in the captured image of the eye where the image intensity gradient is maximum. These positions will correspond to regions where the colour contrast between the iris and pupil, and the iris and sclera is a maximum—namely, at the boundary between the iris and the pupil, and the boundary between the iris and sclera.

An illumination source 9 is required to ensure that the eye is sufficiently illuminated during the image capture process, to enable a sufficiently high quality image of the eye 5 to be captured, for generating an iris bit pattern. Conventionally a near-infrared (NIR) or infrared (IR) light source is used to illuminate the iris for image capture. The captured one or more images of the iris are represented by a 256 byte grey-scale iris bit pattern. Using NIR or IR light sources in place of light sources operating in the visible spectrum is preferable, since this reduces the pupil/iris localisation difficulties associated with distinguishing similarly coloured pupils from irides. Although the herein described embodiments of the present invention comprise NIR or IR sources, it is to be appreciated that the present invention will work with any type of iris recognition identification system, irrespective of the type of light source used.

To complete the registration process, once the image of the eye has been captured and the iris localised (i.e., the position of the iris has been determined), the imaged iris pattern is converted into a 256-byte bit pattern. This bit pattern is stored in an accessible database 11 for future cross-referencing purposes. For a detailed description of the process involved in generating the bit pattern, the interested reader is again referred to the aforementioned prior art documents. Once a user's iris bit pattern has been stored, it may be accessed for future user identification purposes. In other words, the stored iris bit pattern may be used for iris identification recognition purposes.

The identification process, alternatively referred to as iris recognition, comprises capturing a further image of the user's eye and generating an iris bit pattern as described above. The newly generated iris bit pattern is subsequently compared with all the previously generated iris bit patterns stored in the database 11, to generate a match. This type of cross-referencing may be referred to as a "one-to-many" matching process. The identity of the individual may be inferred once a positive match has been generated.

In multi-eye iris identification recognition systems, a positive match of both generated iris bit patterns is required for identification purposes.

The comparison or cross-referencing step, alternatively referred to as the matching process, may comprise determining a Hamming distance between the subject iris bit pattern, and each previously generated iris bit pattern stored in the database. The Hamming distance provides a measure of the similarity between two compared iris bit patterns. Conventionally, this distance is normalised such that a Hamming distance of 0 is indicative of an exact match between the two compared bit patterns, whereas a Hamming distance of 1 indicates that none of the bits comprised in the compared iris bit patterns match—mathematically, this is indicative of the two compared bit patterns being the complements of each other.

To mitigate for small errors which may arise during iris image capture, in practice, the majority of known iris recognition identification systems apply a Hamming distance threshold value. Where the calculated Hamming distance between two compared iris bit patterns lies within this threshold value, a positive match is made—in other words, the two compared bit patterns are determined to be derived from the same iris. Where the calculated Hamming distance is greater than the defined threshold value, a negative result is returned—in other words, the two compared iris patterns are determined as deriving from two different irides. Clearly, the lower the threshold Hamming distance value is, the greater the statistical similarity required between the compared iris bit patterns to generate a positive match. As a result, positive matches generated in such systems tend to be statistically more accurate than systems having larger Hamming distance threshold values. However, a lower Hamming distance threshold value is also likely to increase the rate of false negative results—namely, where the system incorrectly returns a negative result when in fact the compared iris bit patterns relate to the same iris. This may occur where the quality of the captured iris image is poor and lacking resolution.

Going forward, and for present purposes a false reject will be defined as an event where the iris recognition identification system incorrectly returns a negative result. In other words, where during the matching step, the system incorrectly determines that the two compared iris bit patterns are associated with different irides. In practice, when defining the Hamming distance threshold value, the benefits of having an accurate system need to be weighed against the disadvantage of having an increased false reject rate. Extensive studies regarding the most convenient Hamming distance threshold values for use in iris recognition identification systems have been carried out, and are known from the above cited prior art. Such discussions fall outside the scope of the present invention and the interested reader is referred to the aforementioned prior art documents for further information in this regard.

A clear shortcoming of the generic prior art system illustrated in FIG. 1, is that it is unable to distinguish between a photograph of an iris and a real iris. Accordingly, a clear way of deceiving the prior art system, and as mentioned in the background section, is to present a picture of an iris to the camera 3 during the identification process. Provided that the resolution of the imaged iris is sufficiently high, the accuracy of the generated iris bit pattern is likely to be sufficient to result in a positive match being determined during the matching process. As mentioned previously, the present invention provides a security feature to mitigate for this existing shortcoming of the known prior art systems.

Figure 2:
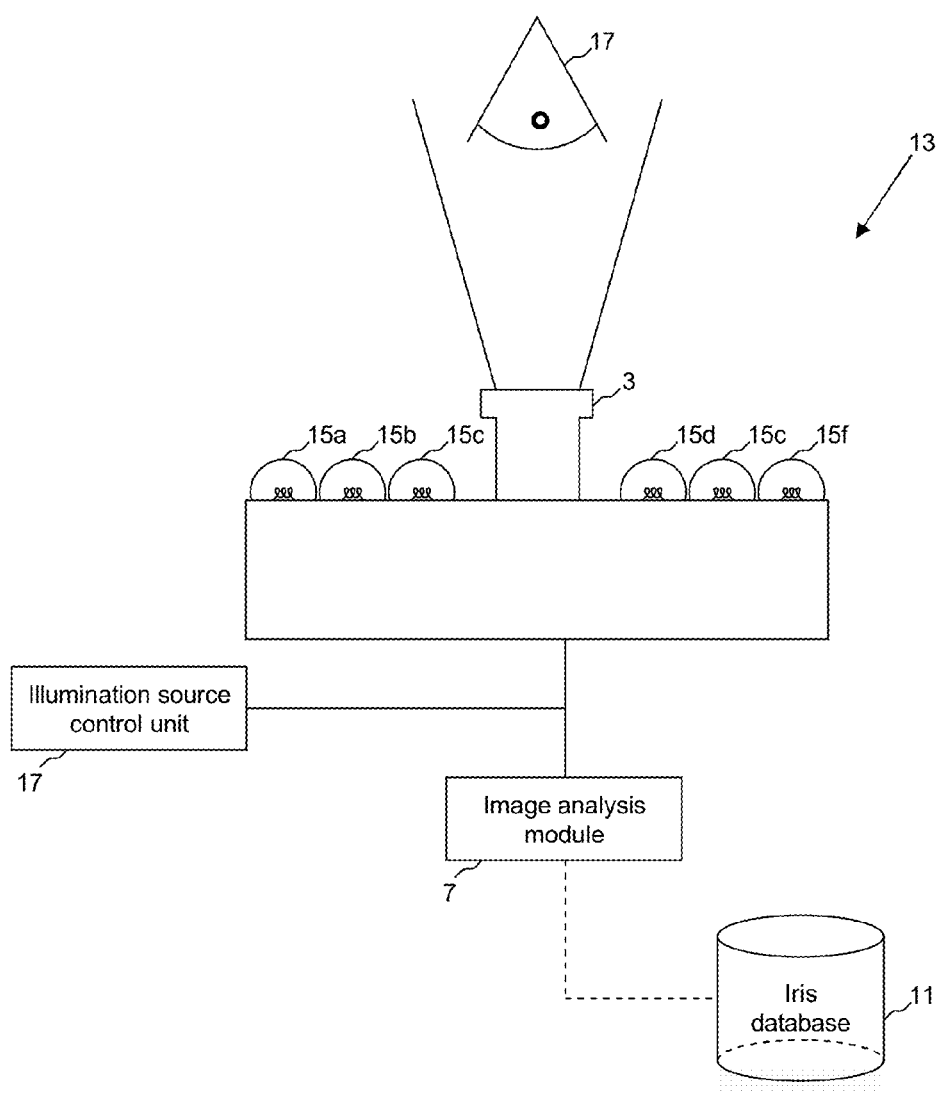
FIG. 2 is a schematic diagram showing an iris recognition identification system according to an embodiment of the present invention.

FIG. 2 illustrates apparatus 13 in accordance with an embodiment of the present invention, and specifically illustrates an example of apparatus which may be used to resolve the shortcomings of the prior art iris recognition identification systems. The illustrated system differs from the prior art system of FIG. 1 in that a plurality of light sources 15a, 15b, 15c, 15d, 15e, 15f, each light source having a different position and optionally a different angle of orientation, are provided. In addition, an illumination source control unit 17 is provided to enable the different light sources 15a, 15b, 15c, 15d, 15e, 15f to be selectively activated.

A specularity will form in the pupil or iris region of a human eye, when illuminated at an angle. The location of the formed specularity in the pupil/iris region will, at least in part be dependent on the angle of incidence of the light incident on the cornea, and the geometrical shape of the subject cornea. The mathematical relationship is given by $$D = R \sin \theta \qquad (\text{eq. 1.0})$$

where D is the radial distance of the specularity measured from the centre of the pupil, R is the radius of curvature of the cornea, and θ is the angle of incidence of the illuminating light at the surface of the cornea. Equation 1 defines a ring centred on the centre of the pupil, where the specularity is likely to be formed. For a given cornea, R is constant. Accordingly, the angle of incidence of the illuminating light at the surface of the cornea is the only user-controllable variable affecting the location of the formed specularity. It is important to note that D, the radial position of the specularity, is not restricted to values lying exclusively within the pupil. Instead, and depending on the angle of incidence, D may correspond to a radial position located on the iris. For this reason, when referring to the specularity position in the present description, the convention of referring to such positions as "pupil/iris" region is adopted, and is used to refer to any position lying within the pupil and/or iris region of the eye.

The angle of incidence may be varied by varying the position of the light source with respect to the eye, and specifically with respect to the cornea. There are several different ways this may be achieved. One way in which this may be achieved, and as illustrated in FIG. 2, is to provide several different light sources 15a, 15b, 15c, 15d, 15e, 15f, each one located at a different position with respect to the eye position. In this way, the rays of light emitted by each different light source 15a, 15b, 15c, 15d, 15e, 15f, are incident on the cornea at different angles of incidence. Accordingly, the position of the specularity formed in the pupil/iris region of the eye resulting from each different light source, will be different.

The formed specularity may be used as a security feature, as will be described in the following paragraphs. Since the angle of incidence of light striking the cornea is dependent on the position of the light source 15a, 15b, 15c, 15d, 15e, 15f relative to the user's eye 17, the position of the specularity formed in the pupil/iris region of the eye 17 is variable by varying the relative position of the activated light source 15a, 15b, 15c, 15d, 15e, 15f, with respect to the eye 17. For example, one non-limiting way in which this may be achieved, is to vary the activated light source illuminating the eye. The angle of incidence of the light incident on the cornea is known from the location of the activated light source relative to the eye 17. Provided that the radius of curvature R of the subject cornea is known, the position of the resulting specularity, referred to as D, may be determined.

An alternative way in which the angle of incidence of light incident on the cornea may be varied, is through use of a movable light source, or any apparatus which enables the relative position of the light source to be varied with respect to the user's eye. In such embodiments, several different light sources may not be required. For example, a single, position variable light source may be used instead. To vary the angle of incidence of the light incident on the cornea, the relative position of the movable light source with respect to the user's eye is simply varied. Such embodiments may require a control unit to selectively control the position of the light source. For example, the light source may be mounted on a guide rail affixed to the image capture camera. The control unit enables the position of the light source to be selectively varied along the length of the guide rail, as controlled by the control unit.

The skilled reader will appreciate that a further alternative option, which falls within the concept of establishing a relative position change between the activated light source and the user's eye, is to vary the position of the user's eye with respect to the light source. This may be a less desirable solution in certain practical embodiments, since it is a general objective of most practical biometric identification system to minimise the requirements placed on the user for successful operation of the biometric system, which may increase the likelihood of user introduced errors skewing the obtained results.

The above described embodiments wherein the position of the activated light source is varied relative to a stationary user's eye, such that the position of the formed specularity is varied, are preferred in practice over embodiments requiring variation of the user's eye, since these are generally associated with an improved user experience.

Figure 3:
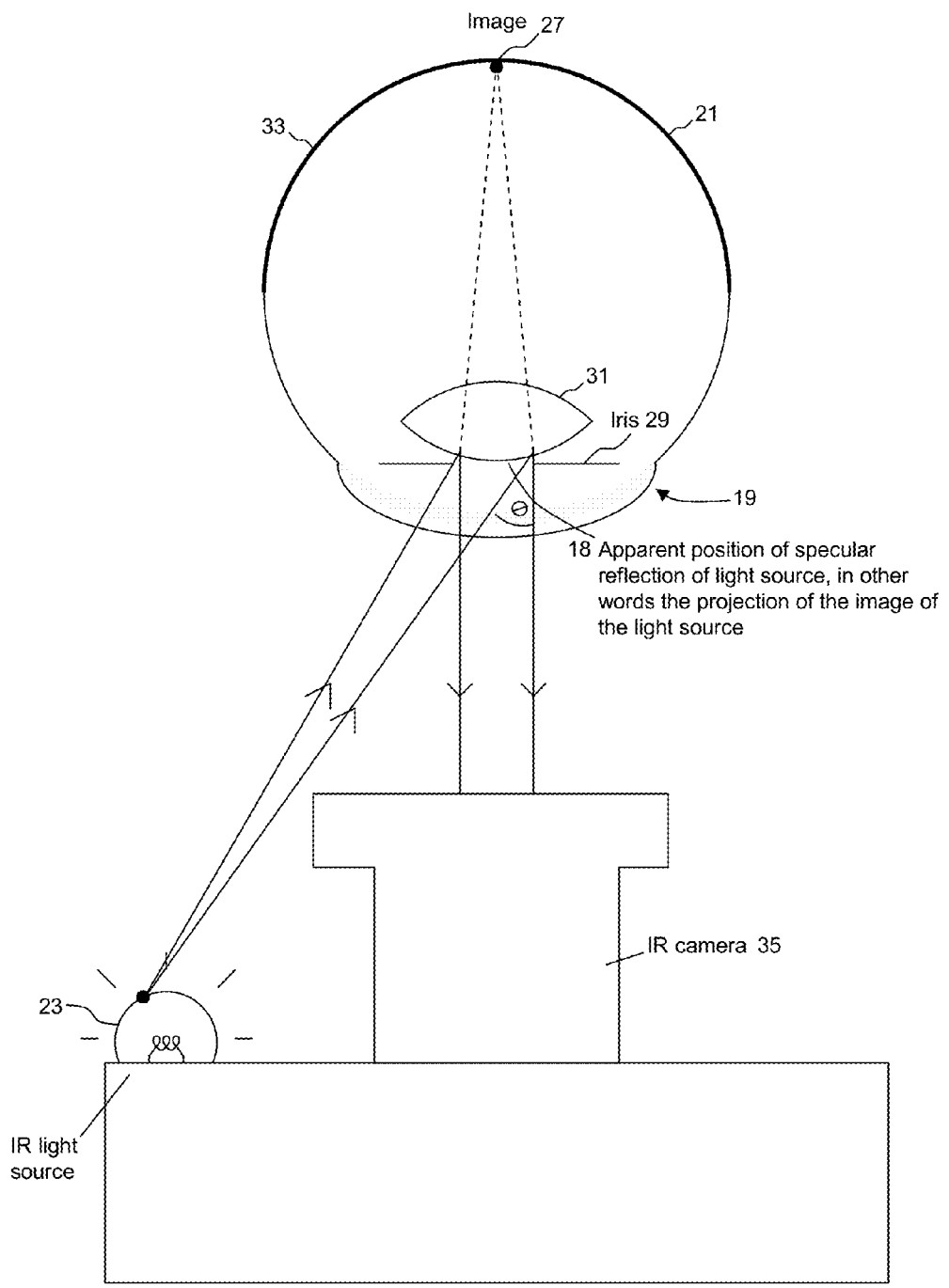
FIG. 3 is a schematic diagram showing the how a specularity is apparently generated in the pupil/iris region of an eye.

FIG. 3 is a plan view illustration of an example of a specularity 18 being formed in the pupil/iris region 19 of a user's eye 21, due to a single activated light source 23 located on or near the capture camera 25. The skilled reader will appreciate that the physical principle underlying the formation of a specularity is substantially similar to the "red-eye" effect, and may be thought of as a reflection of the light source in the pupil/iris region 19 of the eye 21. It is clear from FIG. 3 that the real image position 27 lies behind the iris 29 and the lens 31, in the retinal region 33 of the eye 21. The specularity 18 may equally be described as the projection of the image of the light source in the pupil/iris region 19.

Figure 4A:
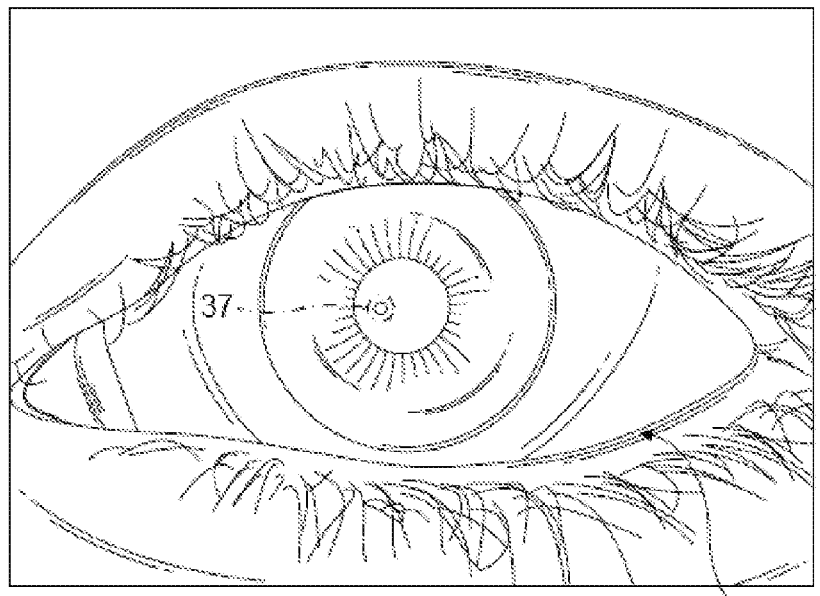
FIG. 4a is an example of an image of an eye captured with the iris recognition identification system of FIG. 2, the image comprising a specularity resulting from a single light source illuminating the cornea and positioned in the pupil/iris region.
Figure 4B:
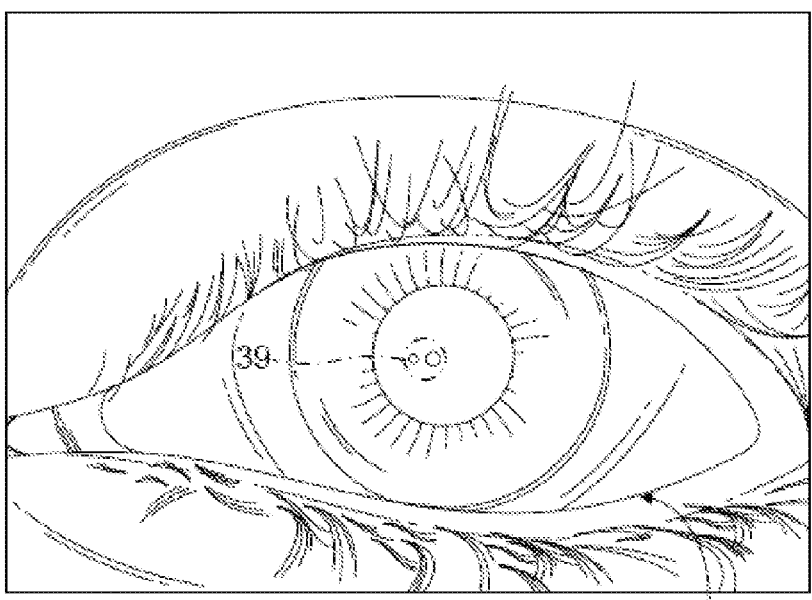
FIG. 4b is an example of an image of an eye captured with the iris recognition identification system of FIG. 2, the image comprising two specularities resulting respectively from two different light sources illuminating the cornea, and the specularities being positioned in the pupil/iris region.

FIGS. 4a and 4b are images of an eye 35, wherein one or more specularities are clearly visible in the pupil region of the eye, as captured by the system illustrated in FIG. 2. The captured images are in 256 byte grey-scale, as captured by a camera operating in the NIR. Accordingly, the light sources used in the present embodiments emit light in the NIR spectrum.

FIG. 4a shows one specularity 37 located in the pupil region. Such a specularity may arise when only one of the light sources of FIG. 2 is active.

FIG. 4b is an example of a captured image of a user's eye displaying two different specularities 39 located at different positions in the pupil region of the user's eye, resulting from two different simultaneously activated light sources, respectively located at different positions with respect to the eye.

In alternative embodiments it is feasible to simultaneously activate two or more different light sources, each different light source being associated with a different position relative to the eye, and each simultaneously activated light source forming a different specularity in the pupil/iris region of the eye. In other words, the number of specularities formed in the pupil/iris region is directly proportional to the number of different light sources simultaneously activated during image capture. For example, where two different light sources are simultaneously activated, two specularities are formed in the pupil/iris region as illustrated in FIG. 4b.

Figure 5A:
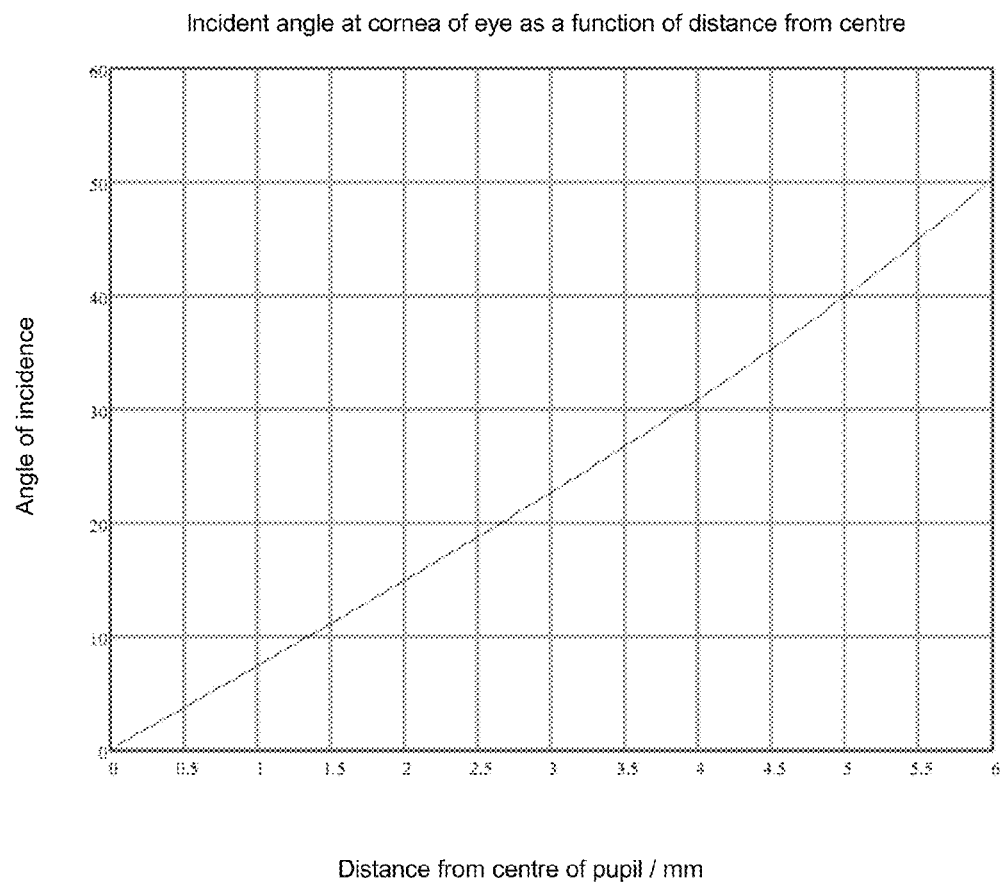
FIG. 5a is a graph illustrating the relationship between the angle of incidence of light incident on the cornea, and the radial position of the specularity in the pupil/iris region of the eye, for an eye having a perfectly spherical cornea.

FIG. 5a is a graph of equation 1.0, and highlights the relationship between the angle of incidence of light incident on the cornea, and the radial distance of the formed specularity position. The radial distance is defined with respect to the centre of the pupil, and the illustrated results are calculated for an eye comprising a perfectly spherical cornea characterised by having a radius of curvature of 7.8 mm. The relationship is substantially linear over the illustrated range of angles and shows that a larger angle of incidence is associated with a specularity located at a greater radial distance from the centre of the pupil. The angle of incidence may be defined as the angle formed between the incident light ray and a unit vector normal to the cornea. The skilled reader will appreciate that the precise mathematical relationship between the angle of incidence and the radial distance of the formed specularity will be dependent on the geometrical characteristics of the subject eye, and in particular will be dependent on the radius of curvature of the subject cornea.

Since it is impractical to perform an ophthalmological measurement of the user's eye to obtain corneal radius of curvature (R) information prior to image capture, the inherent variation in relationship between angle of incidence and radial distance of specular image formation between different users' eyes, may be compensated for by defining a region of interest comprising a range of radial values associated with each angle of incidence value. It is noted that the statistical average corneal radius of curvature value is 7.8 mm. The range of radial values may vary, for example, by +/−10% about the mean value of 7.8 mm. Accordingly, it is possible to define a range of values of D (radial distance, see equation 1.0) which correlate to the range of values of R (corneal radius of curvature). On this basis, rather than explicitly defining the radial position of the specularity for a given angle of incidence θ, a range of values of D are defined, which describe the positions where the specularity may form for each value of θ. The exact radial position value is ultimately dependent on the corneal radius of curvature value of the subject eye. In this way, a range of expected radial position values are associated with each angle of incidence, thus compensating for variations in radial position resulting from fluctuations in corneal radius of curvature values between different eyes. For a given angle of incidence θ, the actual radial position R is likely to be bound by the inequality $$R_{min} \leq R \leq R_{max}$$ (eq. 1.1)

It is important to note that the above cited variation of +/−10% about the mean value of 7.8 mm is provided for illustrative purposes only, it is not restrictive and other ranges may be used. In practice, the range may be defined in terms of pixels. For example, the range may be defined as +/−40 pixels in the vertical and horizontal directions about the expected position value. Since each pixel is associated with a finite length and/or width, expressing the range in numbers of pixels, is merely another way of expressing a length measurement (i.e., a distance value).

Figure 5B:
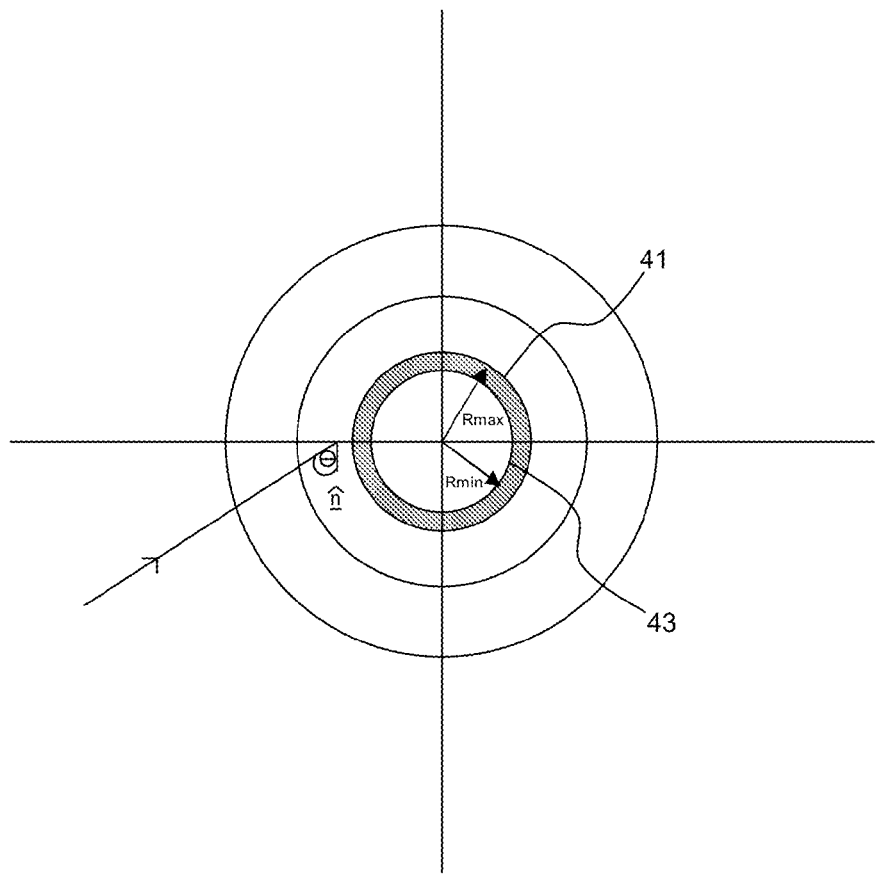
FIG. 5b is a schematic illustration of an iris and pupil, comprising a two-dimensional torus embedded therein defining a range of expected radial position values of the formed specularity for a given angle of incidence of illuminating light.

The skilled reader will appreciate that the range of expected specularity radial position values (i.e., equation 1.1), define a two-dimensional torus—a doughnut-shaped ring. This is illustrated in FIG. 5b. The maximum value of the corneal radius of curvature, $R_{max}$, defines the exterior circumference of the torus 41, whilst the minimum value of the corneal radius of curvature, $R_{min}$, defines the internal circumference 43. The torus illustrates graphically the area of the pupil/iris where it is expected that the specularity will form for a given angle of incidence θ.

Figure 6:
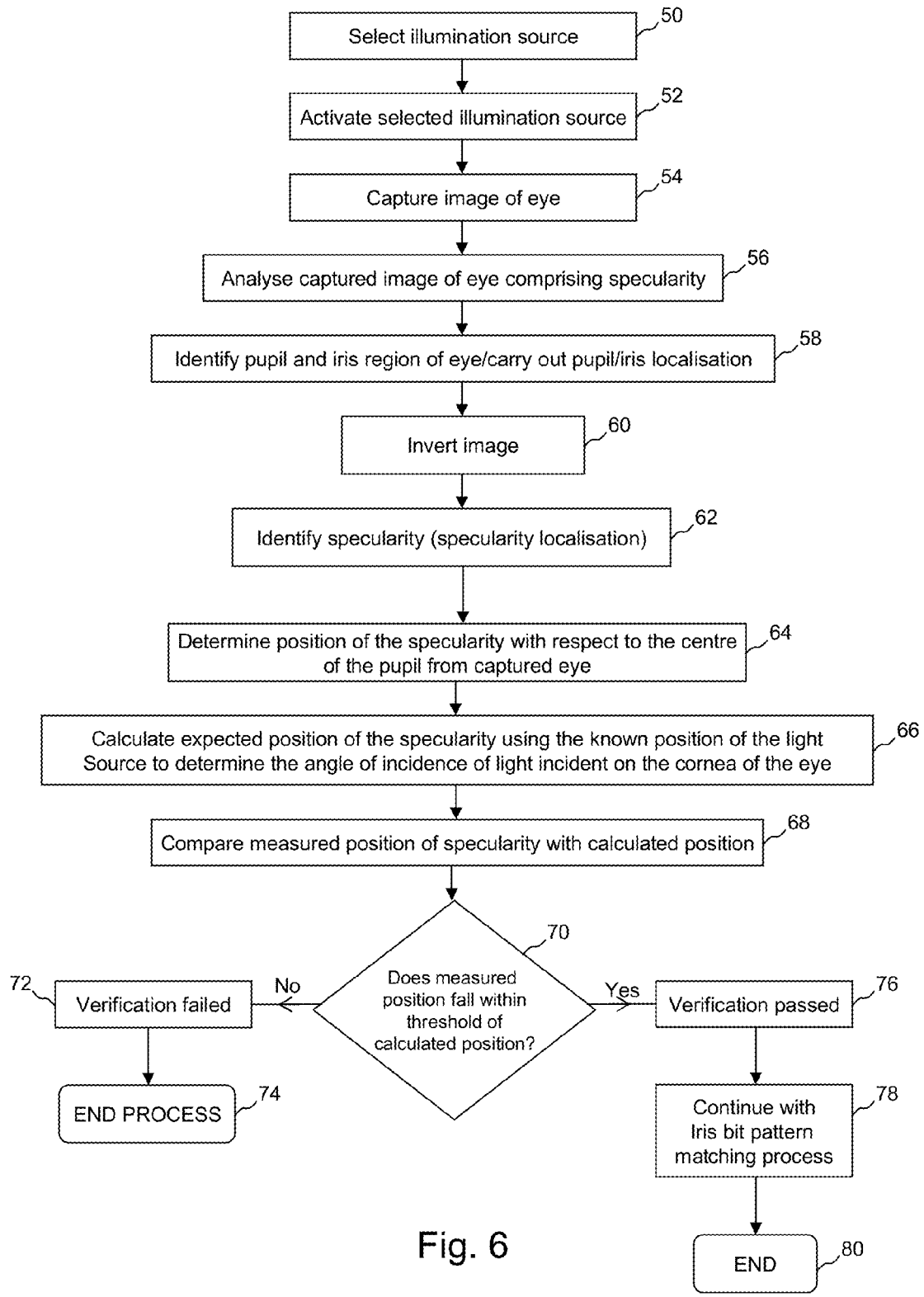
FIG. 6 is a flow chart illustrating the method carried out by the apparatus of FIG. 2 to determine if the position of an observed specularity is consistent with the calculated position.

FIG. 6 is a process flow chart illustrating the method used in accordance with the simplest embodiment of the present invention, wherein a single specularity generated by a single activated light source is used as a random security feature. The method is preferably used with the apparatus illustrated in FIG. 2, since this apparatus provides a plurality of illumination sources located at different positions, thus enabling the angle of incidence of the emitted light rays incident on the cornea of the eye to be selectively varied, by selectively varying the active illumination source.

The present method may be incorporated into the conventional iris identification method carried out by known iris recognition identification system. Preferably, the present method is carried out prior to carrying out the iris identification step. In this way, only if the present method returns a verification passed result is the iris identification process carried out, ensuring a more efficient use of system resources. In other words, if the present method determines that the object presented to the iris recognition identification system for imaging is not a genuine eye, for example as may be the case if a photograph of an eye is displayed before the capture camera, then the process is terminated prior to generating a bit pattern of the imaged iris and matching it with known iris bit patterns stored in the iris database.

The present method is initiated at step 50, by the system 13 selecting an illumination source 15a, 15b, 15c, 15d, 15e, 15f, for activation. In preferred embodiments this selection process is random. The selection process may be controlled by the illumination source control unit 17, which may also comprise a random illumination source selection module (not shown) to ensure that the illumination source 15a, 15b, 15c, 15d, 15e, 15f, is randomly selected. This feature helps to minimise the likelihood that a fraudulent user may correctly anticipate which light source will be activated, and correctly predict the location in the pupil/iris region of the resulting specularity. For example, the position of the specularity could be anticipated if the position of the activated illumination source is known to the fraudulent user before it is activated, in which case a fraudulent image of an eye could be doctored to comprise an image of a specularity located in the expected pupil/iris region. In such an example, the present method may generate a false positive result—in other words, the method is likely to incorrectly determine that a genuine iris has been presented for identification, instead of correctly determining that a pre-captured image of an iris has been provided for identification (i.e., a photograph of an iris). This hypothetical and albeit extremely unlikely scenario, may be compensated for by ensuring that the selection of the active illumination source is truly random. This minimises the likelihood of a fraudulent user correctly predicting which light source will be activated to generate the specular security feature.

Once the illumination source has been selected it is temporarily activated at step 52, to illuminate the target eye, to enable an image of the eye and specifically to enable an image of the iris to be captured at step 54. In order to maximise the captured image resolution, it is necessary to minimise the likelihood of any shadows forming in the captured image. In preferred embodiments the illumination sources are positioned below eye level, in order to illuminate the eye from below, to minimise the formation of shadows resulting from incident light being obstructed by features of the user's face—in particular to minimise the obstructions of incident light by the eyebrow and forehead region of the user's face.

Once the image has been captured, the image is analysed at step 56. This image analysis may be carried out by the image analysis module 7 illustrated in FIG. 2. The object of the image analysis step 56 is to locate the specularity within the captured image of the eye. Known image processing techniques may be used, which will be known to the skilled reader. For example, one way in which the process could be initiated is to first carry out pupil/iris localisation at step 58. One way in which this may be achieved, and as discussed previously, is to conduct an intensity-gradient analysis of the captured image. The intensity-gradient will be a maximum at the junction (i.e., the border) of two colour contrasting regions of the eye—in other words, at the boundary between the iris and sclera, and the boundary between the pupil and the iris. This method step can be automated using existing, conventional image analysis software to identify respectively the iris-sclera boundary and the pupil-iris boundary. In this way, the position of the iris and the pupil within the captured image is localised.

Once the pupil and the iris have been localised, the position of the formed specularity may be determined using further image analysis techniques. The pupil/iris localisation step also enables the centre of the pupil to be identified, which is preferably the starting position for carrying out the specularity localisation step. Specularity localisation may be achieved by first inverting the captured image into a negative image at step 60. By negative image is intended an image wherein the light areas appear dark and vice versa. In embodiments adopting an IR or NIR camera, the captured image of the eye is gray-scale and accordingly no colour inversion occurs. The specularity will appear almost entirely black in the negative image, whereas the pupil and the sclera will appear very bright.

Specularity localisation is carried out by analysing the image intensity gradient across the pupil/iris region of the negative image of the eye at step 62. The objective being to identify the area of the negative image associated with the largest intensity gradient. The intensity gradient at the boundary between the specularity and the pupil/iris region will be large. Therefore, by analysing the image intensity gradient across the pupil/iris region, it is possible to identify the specularity position within the image. In other words, the specularity position is identified by associating the image points comprised within the pupil/iris region having the largest intensity gradient with the boundary of the specularity with the pupil/iris region. In a preferred embodiment, the specularity localisation step, and specifically the analysis of the image intensity gradient is initiated by first identifying the centre of the pupil, if this has not previously been identified during the pupil and iris localisation step. The intensity gradient analysis is then carried out by progressively moving radially outward from the pupil centre to identify the specularity position.

A benefit of the afore described specularity localisation method is that this also enables the shape of the specularity to be determined. This may be important to distinguish the generated specularity from any naturally occurring specularity in the user's eye. For example, where a circular shaped illumination source is used for specularity formation, it is expected that the generated specularity will be circular and/or elliptically shaped, since the specularity may be thought of as the projection of the image of the illumination source in the pupil/iris region of the eye, its shape will be dependent on the shape of the illumination source. On this basis, any identified specularity whose geometrical shape is inconsistent with the geometrical shape of the active illumination source may be disregarded as a naturally occurring specularity, and the specularity localisation step is continued until a specularity consistent with the geometrical shape of the active illumination source is identified.

The skilled reader will appreciate that standard edge detection techniques may equally be applied to determine the shape of the specularity.

Once the specularity has been identified, its position with respect to the centre of the pupil is determined from the captured image at step 64. This step may optionally be incorporated into the specularity localisation step. The object of determining the position of the specularity in the captured image, is for comparison with an expected specularity position. However, such a comparison requires using a shared measurement frame (in other words a shared measurement unit), to ensure that the determined position values and the calculated position values are expressed with respect to the same measurement unit and the same reference point. For example, one may wish to express distances with respect to the real physical measurement frame (i.e., the real world measurement frame, wherein distances are expressed in mm, cm etc.), and as measured with respect to the centre of the pupil. To associate a real physical unit of distance to the radial coordinate of the specularity position as obtained from the captured image of the eye, the scale of the image is required. In those embodiments where the image scale is 1:1 (i.e., the image size is equal to the object size), the radial distance may be directly measured from the captured image. However, in embodiments where the image scale is not 1:1, scaling information is required to translate the radial distance values obtained from the image, into real physical distance values. The reader skilled in optical design will realise this is effectively a coordinate transform problem, wherein a distance expressed in one coordinate frame—namely, expressed in image space—must be re-expressed in object space.

One way in which this coordinate transform problem may be resolved is using the known optical properties of the camera, in particular the magnification properties of the lens system and the pixel density (e.g., pixels $mm^{-1}$) of the sensor. The magnification properties of the lens system define the relationship between the object size (in this instance the eye) and the image size (the captured image of the eye). Accordingly, knowing the image size, which may effectively be determined by pixel counting, and the magnification properties of the lens at the instance the image was captured, enables the object size (the size of the eye) to be determined. The image scaling is then merely the ratio of the object size (real size of the eye) and the image size (the size of the captured image). The radial distance of the specularity expressed with respect to the centre of the pupil may then first be determined in image space—in other words, expressed with respect to the image frame of reference. The real physical distance of the specularity may then be determined using the known lens system's magnification value and the radial distance expressed in the image frame of reference. In this way, a real physical distance value may be assigned to the determined radial distance of the formed specularity from the captured image. Alternative methods of resolving this coordinate transform problem may be used in conjunction with the present method. The herein provided example is to be construed as merely one non-limiting example, and embodiments comprising such alternatives fall within the scope of the present invention.

Once the position of the specularity in the captured image has been determined, the expected position of the specularity is calculated at step 66 on the basis of the known angle of incidence of the light emitted from the selected, activated illumination source using equation 1.0, and assuming a mean value for the corneal radius of curvature R. As mentioned previously, the expected position of the specularity may be expressed as a range of expected radial position values. The angle of incidence may be determined knowing the position of the illumination source with respect to the object (i.e., the eye).

Once both the theoretically calculated position of the specularity and the actual determined position of the specularity have been expressed with respect to the same coordinate measurement frame (e.g., the object frame), then they may be compared with each other at step 68. At step 70 it is determined if the positions are consistent with each other. By consistent is intended where either the expected and measured specularity position values are substantially equal, or where the measured position falls substantially within the expected radial range of position values (see equation 1.1)

If the comparison step 70 reveals that the radial position determined from the captured image and the expected radial position value are not consistent, a verification failed result is returned at step 72. An inconsistency between measured and expected radial specularity positions suggests that the imaged specularity has not arisen as a result of the selected and activated illumination source. For example, this might occur where a naturally occurring specularity has been mistaken for the specularity caused by the active illumination source. Alternatively, this may occur where the imaged object does not relate to a real eye, but to an object whose reflective properties differ to those of an eye, such that equation 1.0 no longer holds. This might occur where a pre-captured image (e.g., a photograph) of an eye is presented for imaging before the camera. When a verification failed result is returned at step 72, the identification process is terminated at step 74.

If instead the comparison step 70 reveals that the measured specularity position and the expected specularity position substantially coincide (i.e. where the positions are substantially equal or the measured specularity position falls within the range of expected specularity positions), then a verification passed result is returned at step 76. This is indicative that the imaged specularity has arisen as a result of the selected activated illumination source, and that the reflective properties of the imaged object are consistent with the reflective properties of a real eye. A verification passed result is thus indicative that a real eye has been presented before the iris recognition identification system for imaging.

Once a verification passed result is returned at step 76, the iris recognition process may be continued. For example, this might comprise continuing with the identification process at step 78 by generating an iris bit pattern from the captured image, and matching the iris bit pattern with existing bit patterns stored in the database. The identification process is completed at step 80.

The security of the above described method may be further improved by introducing a random temporal variable into the method outlined in FIG. 6. In such embodiments a random illumination sequence is generated to create one or more time varying specularities in the pupil/iris region, which are subsequently captured in a sequence of sequential captured images (for example, a video sequence) of the eye. The sequence of images may then be individually analysed for consistency with the expected specularity positions, as described previously in relation to FIG. 6.

Figure 7:
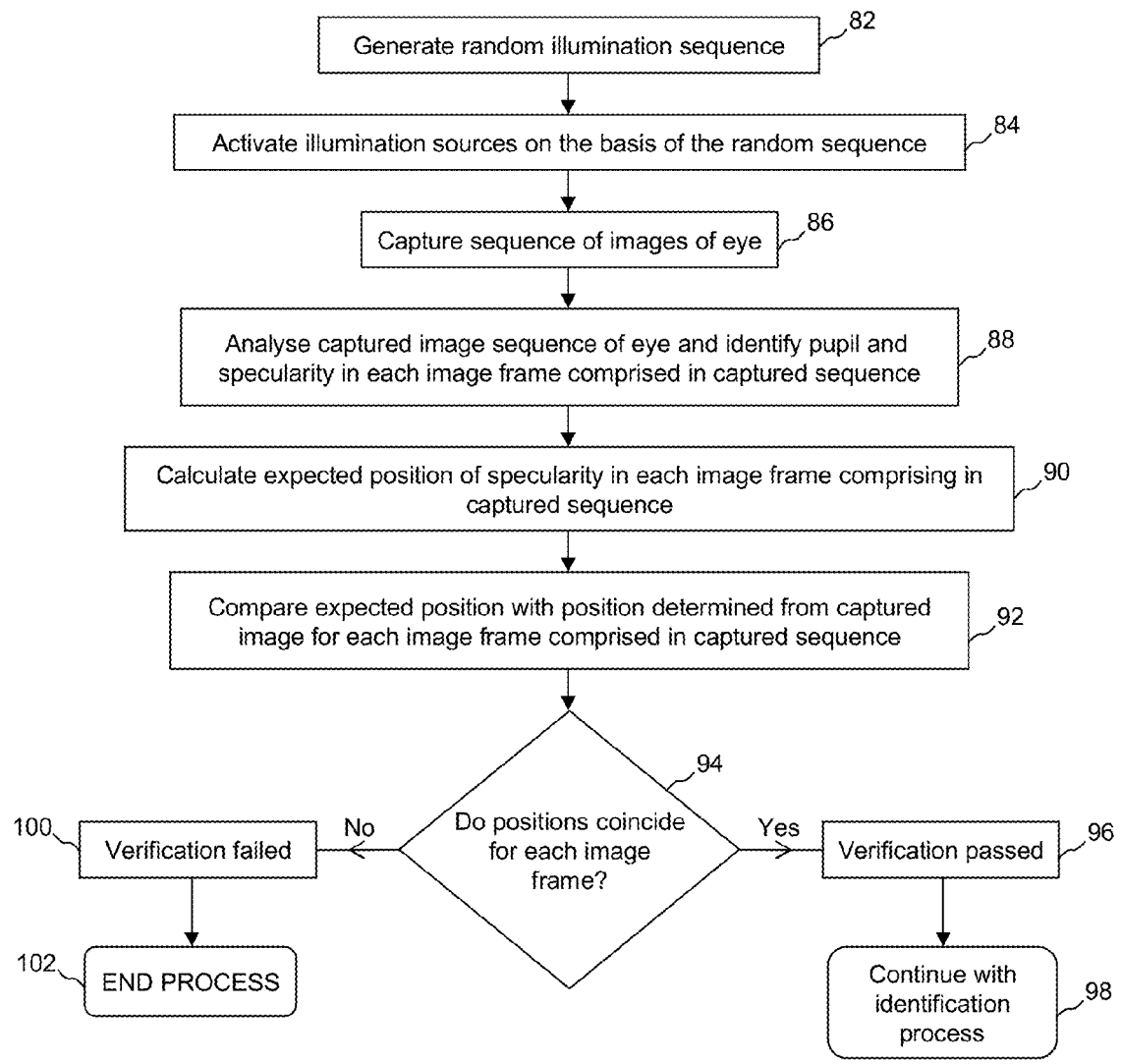
FIG. 7 is a flow chart illustrating a modification of the method of FIG. 6, wherein a random illumination sequence is generated to produce a series of specularities projected at different temporal intervals in the pupil/iris region.

An example of such an embodiment is illustrated in the process flow chart of FIG. 7. In step 82, a random illumination sequence is generated. This step may be carried out by a signal generator (not shown) coupled to the illumination source control unit 17 of FIG. 2. The signal generator generates an electrical signal comprising a plurality of peaks or pulses, which when received by an associated illumination source 15*a*, 15*b*, 15*c*, 15*d*, 15*e*, 15*f*, activate the source. An identifier, such as a byte identifier may be associated with each peak or pulse comprised in the signal. A filter (not shown) comprised in the illumination source control unit 17 may then forward each pulse comprised in the signal to the appropriate illumination source on the bases of the associated identifier. This is one example of how the plurality of illumination sources 15*a*, 15*b*, 15*c*, 15*d*, 15*e*, 15*f* may be randomly activated. The illumination sequence signal may also define the duration of activation of each light source. The skilled reader will appreciate that other methods for randomly activating the illumination sources exist which may be used in conjunction with the present invention, and such alternatives fall within the scope of the present invention.

This random illumination sequence defines the temporal sequence in which the one or more illumination sources 15*a*, 15*b*, 15*c*, 15*d*, 15*e*, 15*f*, will be activated. The illumination sequence is then executed at step 84, activating the one or more illumination sources 15*a*, 15*b*, 15*c*, 15*d*, 15*e*, 15*f*, in accordance with the generated sequence, whilst simultaneously in step 86 a sequence of images of the eye comprising the one or more specularities is captured by the camera 3. Preferably, the activation of the one or more illumination sources and the activation of the camera are synchronised. In this way, each captured image frame comprised in the sequence of captured images, may be associated with the one or more illumination sources 15*a*, 15*b*, 15*c*, 15*d*, 15*e*, 15*f*, which were active when the subject image frame was captured. It is to be appreciated that the present embodiment requires the system to be able to associate the illumination source activated at a specific moment in time, with the image of the eye captured at the same moment in time.

An alternative way of resolving this requirement is to associate a time coordinate with both the illumination sequence and the captured image sequence. The active illumination source may then be matched with the associated image frame simply by matching the time coordinates associated with respectively the illumination source and the image frame.

This matching process is preferably comprised within the image sequence capture step 86. The method continues with an analysis of each captured image frame comprised in the captured sequence in step 88. Step 88 is substantially as described previously with respect to the method of FIG. 6. Specifically, the pupil-iris localisation is carried out as described previously in step 58 of FIG. 6. Similarly, the position of the specularity is determined as described previously in steps 60 to 64 of FIG. 6, for each image frame captured in step 86.

The expected position of the specularity comprised in each captured image frame is calculated at step 90. This process is analogues to the corresponding method step 66 of FIG. 6, with the exception that this calculation is carried out for a plurality of captured image frames. Since the positions of the one or more active illumination sources associated with the subject captured image frame are known, the angle of incidence of the light incident on the cornea emitted from the one or more active illumination sources may be determined, and used to calculate the expected position of the one or more specularities.

The expected specularity positions are subsequently compared with the measured specularity positions in step 92 for each captured image frame, to determine if the measured positions and the expected positions are consistent. Step 92 is substantially as described in step 68 of FIG. 6, with the exception that the comparison is carried out in respect of each captured image frame comprised in the captured image sequence.

Where it is determined in step 94 that the expected and measured specularity positions are consistent for every image frame comprised in the captured image sequence, a positive verification result is returned at step 96, and the iris recognition identification system may proceed with the identification process in step 98.

In contrast, where there is a discrepancy between any one of the expected and measured specularity positions for any one of the image frames comprised in the captured image sequence, a failed verification result is returned at step 100, and the process is ended at step 102.

The security of the present method of FIG. 7 is greater than the previously described method of FIG. 6, since the number of parameters that need to be anticipated by a fraudulent user are increased. In the method illustrated in FIG. 6, a fraudulent user needs to anticipate the position of one activated illumination source, which in itself is not trivial, and subsequently provide an image of an eye comprising a specularity located at a position consistent with the expected position value on the basis of the position of the active illumination source, to provoke a false positive result. In contrast, in the present method of FIG. 7, a fraudulent user needs to accurately anticipate the expected specularity position value resulting from each randomly activated illumination source to successfully defraud the system. In other words, a fraudulent user needs to accurately anticipate the expected positions of the specularities resulting from the random sequence of activated light sources, and needs to provide a fraudulent sequence of images of an eye, each image in the sequence comprising a specularity located at a position consistent with the expected location determined on the basis of the currently active illumination source. Accordingly, it is clear that there are significantly more parameters that need to be accurately anticipated to successfully deceive an iris recognition identification system employing the method of FIG. 7. These parameters comprise anticipating the sequence in which the illumination sources are activated (and therefore the position of each activated illumination source), and the duration each illumination source is activated for. The likelihood of a fraudulent user successfully anticipating all the required parameters is extremely low. For practical purposes, this method provides a robust countermeasure against specific types of fraudulent acts, such as the use of photographs of eyes to generate fraudulent positive validation results in iris recognition identification systems.

In the above described embodiments, the rate of image capture is preferably 30 frames per second (fps), and the frequency of the illumination sequence is selected to be consistent therewith. For example, the illumination frequency may also be 30 Hz—in other words, the rate at which the activated illumination source changes is 30 times per second. The illumination frequency and the rate of image capture need not be necessarily equivalent. The only restriction being that the illumination frequency should not be greater than the rate of image capture, to ensure that the specularity resulting from each activated illumination source is captured in at least one image in the captured image sequence. The image capture frame rate of 30 fps is a convenient, since this provides a sufficiently large number of different images for analysis, whilst being relatively quick to process.

The skilled reader will appreciate that the security of the present method is proportional to the image capture frame rate. For example, a higher frame rate, is more secure than a lower frame rate, since a higher frame rate is more difficult for a user to anticipate. Higher frame rates are also associated with greater processing times since more images require analysis. This increases the processing demands, which inevitably increases total processing time. In real world applications, where the time taken to complete the iris recognition identification process is to be minimised (e.g., of the order of a few seconds), a balance must be struck between level of security and user convenience. An image capture rate of 30 fps satisfies both these requirements.

The reduced security of a low image capture frame rate, may be compensated for by increasing the total time the illumination sequence is activated for, to increase the number of images in the captured image sequence. For example, to compensate for the decreased security associated with a frame rate of 10 fps, the total time the random illumination sequence is active for may be extended to 4 seconds. In this way 40 different images are generated. However, this solution is generally undesirable as it increases the total time taken to conduct the iris recognition process.

In preferred embodiments, the method of the present invention is incorporated into existing iris recognition identification systems known in the prior art, albeit comprising position variable illumination sources. When combined with known prior art iris recognition identification systems, the methods of the present invention do not result in any significant increase in the total time taken to perform the identification process, since the present methods may be carried out in a relatively short period of time. Preferably, this is of the order of 300 ms to 800 ms.

Alternative embodiments of the present methods discussed with respect to FIGS. 6 and 7, may comprise simultaneously generating two or more different specularities in the pupil/iris region. In such embodiments analysis of the relevant captured image frames will comprise localising the relevant two or more generated specularities.

Whilst only preferred embodiments of the present invention have been presented herein, they are not limiting, and it is to be appreciated that alternative embodiments are envisaged which fall within the spirit and scope of the present invention. Further features of the present invention are set out in the appended claims.

What is claimed is:

1. A method of verifying the authenticity of an eye provided for identification purposes in an iris recognition identification system, the method comprising:
generating an activation sequence specifying a random order and a random duration in which at least one of a plurality of illumination sources is to be activated;

illuminating the eye using infra-red or near infra-red pulses in accordance with the activation sequence, each pulse being emitted from at least one of the plurality of illumination sources to generate a corresponding sequence of specular reflections in a pupil and/or iris region of the eye, each illumination source being located at a different position with respect to the eye, and each specular reflection forming as a result of light emitted from one of the plurality of illumination sources being reflected from the eye;

capturing, from a location that is fixed relative to the plurality of illumination sources, a sequence of images of the eye, the sequence of images including the corresponding sequence of specular reflections;

determining a position and a duration of each specular reflection formed in the pupil and/or iris region, from each captured image in the sequence of images;

calculating, for each captured image in the sequence of images, an associated expected position and an associated expected duration of each specular reflection for an authentic eye; and verifying the authenticity of the eye by comparing the determined position of each specular reflection with the associated expected position, and comparing the determined duration of each specular reflection with the associated expected duration, wherein the verifying step is carried out for each captured image in the sequence of images.

2. The method of claim 1, wherein the verifying step further comprises determining that the eye is authentic if the determined position of each specular reflection is substantially coincident with the associated expected position and the determined duration of each specular reflection is substantially coincident with the associated expected duration.

3. The method of claim 1, wherein the verifying step further comprises determining that the eye is not authentic if the determined position of each specular reflection is not substantially coincident with the associated expected position and the determined duration of each specular reflection is not substantially coincident with the associated expected duration.

4. The method of claim 1, wherein the associated expected position of each specular reflection is associated with a range of expected position values, and the verifying step further comprises comparing the determined position with the range of expected position values for each specular reflection.

5. The method of claim 4, wherein the verifying step further comprises determining that the eye is authentic if the determined position lies within the range of expected position values.

6. The method of claim 4, wherein the verifying step further comprises determining that the eye is not authentic if the determined position lies outside the range of expected position values.

7. The method of claim 1, wherein the capturing step further comprises capturing the sequence of images at a rate of 30 images per second.

8. The method of claim 1, wherein the capturing step further comprises capturing the sequence of images at a rate of at least 20 images per second.

9. The method of claim 1, wherein the calculating step further comprises calculating, for each specular reflection, a radial distance D of the expected specular reflection position, expressed with respect to a center of the pupil of the eye, using the equation:

$$D = R \sin \theta$$

where R is the radius of curvature of a cornea of the illuminated eye, and $\theta$ is the angle of incidence of light emitted from the activated illumination source incident on the cornea.

10. The method of claim 1, wherein the determining step comprises converting, for each captured image in the sequence of images, the captured image into a negative image, and identifying the one or more specular reflections by identifying the darkest colored pixels in the negative image.

11. The method of claim 1, wherein the determining step comprises identifying, for each captured image in the sequence of m the iris and/or pupil in the captured image before determining the position of the one or more specular reflections.

12. Apparatus for verifying the authenticity of an eye provided for identification purposes in an iris recognition identification system, the apparatus comprising:
a plurality of infra-red or near infra-red illumination sources for illuminating the eye to generate a corresponding sequence of specular reflections in a pupil and/or iris region of the eye, each illumination source located at a different position with respect to the eye, and each specular reflection forming as a result of light emitted from one of the illumination sources being reflected from the eye;
a signal generator for generating an activation sequence, the activation sequence specifying a random order and a random duration in which at least one of the plurality of illumination sources is to be activated;
an activation module for activating at least one of the plurality of illumination sources in accordance with the activation sequence;
an image capture device located in a fixed position relative to the plurality of illumination sources, and arranged to capture a sequence of images of the eye, the sequence of images including the corresponding sequence of specular reflections;
a processor programmed with instructions to:
  determine a position and a duration of each specular reflection formed in the pupil and/or iris region from analysis of each captured image in the sequence of images; and
  calculate an associated expected position and an associated expected duration of each specular reflection for an authentic eye for each captured image in the sequence of images; and
a verifying module programmed with instructions to verify the authenticity of the eye by comparing the determined position of each specular reflection with the associated expected position, and comparing the determined duration of each specular reflection with the associated expected duration.

13. The apparatus of claim 12, further comprising:
image analysis module programmed with instructions to localize the pupil and the iris in one or more captured images of the eye.

14. The apparatus of claim 12, wherein the verifying module is programmed with instructions to return a positive verification result where the determined position of each specular reflection is substantially coincident with the associated expected position, and the determined duration of each specular reflection is substantially coincident with the associated expected duration.

15. The apparatus of claim 12, wherein the verifying module is programmed with instructions to return a positive verification result when the determined position of each specular reflection lies within a range of expected positions.

16. A non-transitory computer readable storage medium storing computer-executable instructions that, when executed, cause a computer system to perform a computer-implemented method comprising:

generating an activation sequence specifying a random order and a random duration in which at least one of a plurality of illumination sources is to be activated;

illuminating an eye using infra-red or near infra-red pulses in accordance with the activation sequence, each pulse being emitted from at least one of the plurality of illumination sources to generate a corresponding sequence of specular reflections in a pupil and/or iris region of the eye, each illumination source being located at a different position with respect to the eye, and each specular reflection forming as a result of light emitted from one of the plurality of illumination sources being reflected from the eye;

capturing, from a location that is fixed relative to the plurality of illumination sources, a sequence of images of the eye, the sequence of images including the corresponding sequence of specular reflections;

determining a position and a duration of each specular reflection formed in the pupil and/or iris region, from each captured image in the sequence of images;

calculating, for each captured image in the sequence of images, an associated expected position and an associated expected duration of each specular reflection for an authentic eye; and verifying the authenticity of the eye by comparing the determined position of each specular reflection with the associated expected position, and comparing the determined duration of each specular reflection with the associated expected duration, wherein the verifying step is carried out for each captured image in the sequence of images.

17. An apparatus for verifying the authenticity of an eye provided for identification purposes, the apparatus having one or more integrated circuits performing a method comprising:

generating an activation sequence specifying a random order and a random duration in which at least one of a plurality of illumination sources is to be activated;

illuminating the eye using infra-red or near infra-red pulses in accordance with the activation sequence, each pulse being emitted from at least one of the plurality of illumination sources to generate a corresponding sequence of specular reflections in a pupil and/or iris region of the eye, each illumination source being located at a different position with respect to the eye, and each specular reflection forming as a result of light emitted from one of the plurality of illumination sources being reflected from the eye;

capturing, from a location that is fixed relative to the plurality of illumination sources, a sequence of images of the eye, the sequence of images including the corresponding sequence of specular reflections;

determining a position and a duration of each specular reflection formed in the pupil and/or iris region, from each captured image in the sequence of images;

calculating, for each captured image in the sequence of images, an associated expected position and an associated expected duration of each specular reflection for an authentic eye; and verifying the authenticity of the eye by comparing the determined position of each specular reflection with the associated expected position, and comparing the determined duration of each specular reflection with the associated expected duration, wherein the verifying step is carried out for each captured image in the sequence of images.

18. The method of claim 1, wherein:

the illuminating step comprises associating a first time coordinate with the activation sequence;

the capturing step comprises associating a second time coordinate to each image comprised in the captured sequence of images; and the verifying step comprises matching each of the one or more illumination sources activated by the activation sequence with an associated image in the captured sequence of images by matching the first time coordinate and the second time coordinate.

19. The method of claim 18, wherein the associated expected position and the associated expected duration of each specular reflection is calculated on the basis of the one or more activated illumination sources matched to the associated captured image in the sequence of images.

20. The apparatus of claim 12, wherein:

the illumination sources are arranged to associate a first time coordinate with the activation sequence;

the image capture device is arranged to associate a second time coordinate to each image comprised in the captured sequence of images; and the processor comprises instructions to match each of the one or more illumination sources activated by the activation sequence with an associated image in the captured sequence of images by matching the first time coordinate and the second time coordinate.

21. The apparatus of claim 20, wherein the associated expected position and the associated expected duration of each specular reflection is calculated on the basis of the one or more activated illumination sources matched to the associated captured image in the sequence of images.

22. The method of claim 1, wherein the pupil is substantially aligned with an optical axis of the image capture device.

23. The method of claim 1, wherein the plurality of illumination sources are disposed in a coaxial arrangement with the image capture device.

* * * * *

UNITED STATES PATENT AND TRADEMARK OFFICE
CERTIFICATE OF CORRECTION

| | |
|---|---|
| PATENT NO. | : 9,008,375 B2 |
| APPLICATION NO. | : 13/646424 |
| DATED | : April 14, 2015 |
| INVENTOR(S) | : Imad Malhas et al. |

It is certified that error appears in the above-identified patent and that said Letters Patent is hereby corrected as shown below:

In the Claims

Column 20, line 11, in Claim 11, "for each captured image in the sequence of m the iris" should read --for each captured image in the sequence of images, the iris--.

Signed and Sealed this
Fifth Day of April, 2016

Michelle K. Lee
*Director of the United States Patent and Trademark Office*